United States Patent [19]

Kumar et al.

[11] Patent Number: 5,219,813
[45] Date of Patent: Jun. 15, 1993

[54] PROCESS FOR THE PREPARATION OF NOVEL MOLECULAR SIEVES

[75] Inventors: Rajiv Kumar; Korandla R. Reddy; Paul Ratnasamy, all of Maharashtra, India

[73] Assignee: Council of Scientific & Industrial Research, New Delhi, India

[21] Appl. No.: 816,211

[22] Filed: Jan. 3, 1992

[51] Int. Cl.$^5$ .................. B01J 29/06; C01B 33/20; C01B 33/26; C01B 33/32
[52] U.S. Cl. .................. 502/64; 423/326; 423/328.1; 423/329.1; 423/330.1; 423/332; 423/333
[58] Field of Search .................. 502/64; 423/328, 329

[56] References Cited

U.S. PATENT DOCUMENTS

| | | | |
|---|---|---|---|
| 4,537,754 | 8/1985 | Casci et al. | 423/277 |
| 4,585,638 | 4/1986 | Kuhl | 502/62 |
| 4,585,639 | 4/1986 | Szostak | 502/77 |
| 5,021,141 | 6/1991 | Rubin | 502/64 |
| 5,053,373 | 10/1991 | Zones | 502/66 |
| 5,064,630 | 11/1991 | Verduijn et al. | 502/61 |

*Primary Examiner*—Anthony McFarlane
*Attorney, Agent, or Firm*—Ladas & Parry

[57] ABSTRACT

There is described a process for the preparation of novel crystalline molecular sieves, characterized by a distinctive x-ray diffraction pattern and a chemical composition in terms of mole ratios of oxides in the anhydrous state by the formula $aX_2O:bM_2O_3:cSiO_2$ where X is a mixture of monovalent cation selected from the group consisting of alkali metal, ammonium and hydrogen, M is selected from Al, B, Fe, Ga, Cr or mixtures thereof and $a=0.0$ to $1.0$, $b=0.0$ to $1.0$ and $c=20$ or above. The process includes (i) mixing a source of silicon with (a) a source of alkali metal, (b) an organic compound containing nitrogen selected from the group consisting of hexamethylene bis trialkyl ammonium, salts of hexamethylene bis trialkyl ammonium and mixtures thereof, and (c) optionally, a source of Al, Fe, Ga, B, Cr, or mixtures thereof to form a gel, (ii) heating the resultant gel to form a crystalline material, (iii) quenching the resultant crystalline material in water, filtering, and washing with deionized water thoroughly, (iv) drying, and (v) calcining to obtain a composite catalyst.

18 Claims, No Drawings

PROCESS FOR THE PREPARATION OF NOVEL MOLECULAR SIEVES

FIELD OF THE INVENTION

This invention relates to a process for the preparation of a novel crystalline molecular sieve. More particularly, this invention relates to the preparation of crystalline microporous metallosilicate molecular sieve having catalytic properties in reactions such as isomerization, aromatization, disproportionation of toluene, xylenes, ethylbenzene, etc., alkylation and transalkylation of toluene, conversion of alcohols to olefins and aromatics etc.

SUMMARY OF THE INVENTION

The crystalline, porous, metallosilicate molecular sieves prepared by the process of the present invention are constituted of oxides of silicon and aluminum or other trivalent metals such as boron, iron, gallium, chromium etc. having well ordered porous structure consisting of interconnected channels of precisely defined and uniform dimensions. These materials are also known as zeolites. These molecular sieves may also be constituted of $SiO_2$ tetrahedra only where other metal ions are absent. The molecular sieve prepared by the process of the invention has the chemical composition, in terms of oxide mole ratios: by the formula $SiO_2$:equal to or less than 0.1 $M_2O_3$:equal to or less than $0.2X_{2/n}O$ where x is mixture of cation of valency n, M is one or more of aluminum, iron, gallium, boron and chromium.

DESCRIPTION OF THE PREFERRED EMBODIMENTS

A quite significant feature of the zeolites is the catalytic activity exhibited by them in acid catalyzed reactions. These zeolites possess a rigid framework of cross-linked $SiO_4$ and $AlO_4$ tetrahedra. The negative charge of the tetrahedra containing the trivalent aluminum ione is balanced by the inclusion of a non-framework charge balancing cations usually an alkali metal one. This non-framework alkali metal ion can be replaced by conventional techniques of ion exchange by other cations like $NH_4^+$, $K^+$, $Ca^{2+}$ or $La^{3+}$ etc . . . The deammoniation by calcination in air flow of these zeolites containing $NH_4^+$ cation yields the acid form ($H^+$ form) of the zeolite, which is catalytically active in reactions such as isomerization, alkylation, disproportionation, cracking etc.

The present invention provides a process for the preparation of novel synthetic crystalline molecular sieve. The novel molecular sieve prepared by the process of the present invention, consists of the oxides of Si and M, where M=Al or B or Fe or Ga or mixtures thereof. In a general embodiment of the present invention the starting gel has the following oxide molar ratios:

$SiO_2/M_2O_3 = 20$ or more $SiO_2/X_2O = 2-20$ $SiO_2/R_2O = 5-60$ $H_2O/SiO_2 = 10-100$ $OH^-/SiO_2 = 0.05-0.5$ where M is as described hereinabove, R is an organic molecule like hexamethylene bis (trialkyl ammonium bromide) where alkyl group may be ethyl or propyl or mixtures thereof and X is a monovalent cation such as $Na^+$, $K^+$, $NH_4^+$ etc. In a preferred embodiment of the present invention the starting gel has the following oxide molar ratios:

$SiO_2/M_2O_3 = 30$ or more $SiO_2/X_2O = 3-10$ $SiO_2/R_2O = 10-40$ $H_2O/SiO_2 = 20-70$ $OH^-/SiO_2 = 0.1\ 0.3$ where M, X and R are as described hereinabove Accordingly, the present invention provides a process for the preparation of novel crystalline molecular sieve, characterized by the X-ray diffraction pattern given in table I and a chemical composition in terms of mole ratios of oxides in the anhydrous state by the formula $aX_2O:bM_2O_3:cSiO_2$ where X is a mixture of monovalent cation selected from alkali metal, ammonium and hydrogen, M is selected from Al, B, Fe, Ga or mixtures thereof and a=0.0 to 1.0, b=0.0 to 1.0 and c=20 or above which comprises (i) mixing a source of silicon and sources of Al, Ga, Fe, B or mixtures thereof and alkali metal with an organic compound containing nitrogen (ii) autoclaving the resultant gel by treating at a temperature in the range of 100°-200° under static or rotatic condition (iii) quenching the resultant crystalline material in cold water, filtering and washing with deionized water thoroughly (iv) drying at a temperature in the range of 80°-150° C. for a period ranging from 1-16 hrs, (v) calcining in the temperature range of 400°-550° C. for a period of 12-24 hours to obtain a composite material having predominantly alkali metal as the monovalent cation, (vi) treating the resultant composite material with an aqueous solution containing ammonium ion by ion exchange process to produce a catalyst composite having predominantly ammonium as the monovalent cation and (vii) caloining the resultant composite material by heating at a temperature in the range of 400°-550° C. for a period in the range of 8-24 hours to obtain the catalyst composite material having predominantly hydrogen as the monovalent cation.

In the above said procedures to convert alkali metal form to $H^+$ form via $NH_4^+$ form, it may be likely that the catalyst composite material may have the mixture of alkali metal, $NH_4^+$ and $H^+$ forms. Though the molecular sieve material obtained as here in described may be directly used as a catalyst, it is desirable in various large scale applications, to enhance the mechanical strength and ease of handling by admixing it with a suitable binder material and converting it into a suitable shape such as cylindrical extrudates, spheres, etc. Silica, alumina, clay mineral, such as bentonite, kaolinite and mixtures thereof are the examples of suitable binder material which imparts improved mechanical properties to the metallosilicate catalyst composite material.

According to a further feature of the present invention, the metal ions in the catalyst composite material prepared are in trivalent positive oxidation state and are present in crystalline framework lattice positions and are not present as non-framework cations in positions where they can be replaced by ion exchange.

The structure of the molecular sieve material prepared by the process of the present invention can be characterized by x-ray different techniques. The X-ray powder pattern, taken on a Philips PW 180 diffractometer using CuK radiation is shown in Table 1.

TABLE 1

X-ray diffraction of Catalyste Composite Material.

| 2θ | d () | Relative Intensity |
|---|---|---|
| 6.054 ± 0.20 | 14.487 ± 0.45 | vs–s |
| 7.368 ± 0.20 | 11.988 ± 0.40 | s |
| 8.178 ± 0.20 | 10.803 ± 0.40 | s |
| 10.938 ± 0.20 | 8.082 ± 0.40 | w |
| 14.544 ± 0.20 | 6.082 ± 0.40 | w |
| 17.664 ± 0.15 | 5.017 ± 0.30 | w |
| 18.504 ± 0.15 | 4.791 ± 0.30 | w |
| 21.054 ± 0.10 | 4.216 ± 0.25 | s |
| 22.374 ± 0.10 | 3.970 ± 0.20 | vs |
| 24.804 ± 0.10 | 3.587 ± 0.20 | w |
| 30.936 ± 0.05 | 2.888 ± 0.20 | w |
| 37.326 ± 0.05 | 2.407 ± 0.15 | w | a: Based on a relative intensity scale in which the strongest line in the X-ray pattern is assigned a value of 100:
vs (very strong) > 60
s (strong) > 40 but < 60
m (medium) > 20 but < 40
w (weak) < 20, After calcination at 550° C. for 16 hours in the flow of air and ion exchange of the charge balancing cations (for example $Na^+$) by other cations like $NH_4^+$, $H^+$, $K^+$, $Ca^{2+}$ etc., the molecular sieve material shows the same x-ray diffraction pattern as given in Table 1 with some minor shift in angle 2θ or d-spacings.

The presence of Al, B or Ga in tetrahedral lattice positions of the molecular sieve composite material can be evidenced by solid state magic angle spinning nuclear magnetic resonance spectroscopy (MAS NMR). The evidence for the presence of Fe in molecular sieve framework can be obtained by electron spin resonance spectroscopy (ESR) (g=4.3), Mossbauer spectroscopy (chemical shift=0.2–0.3 mm/s at room temperature) and magnetic susceptibility data (5.6–5.9 B.M.)

The practice of the present invention will be further described in the reference of the following examples which are for the illustrative purposes only and are not to be construed as limitation on the invention.

EXAMPLE 1

In this example the detailed method of the preparation of the molecular sieve material will be described. In a typical preparation 0.67 g. $Al(NO_3)_3.9H_2O$ and 5 g. Sulphuric acid were added to 50 g. distilled water to yield solution A. The solution A is mixed to the reaction vessel containing 30 g. tetraethyl orthosilicate (TEOS) with continuous stirring for half an hour. Then 8.57 g. hexamethylenebis(triethyl ammonium bromide) in 30 g. $H_2O$ was added slowly to aluminosilicate mixture. Finally 1.9 g. NaOH in 20 g. $H_2O$ was added under vigorous stirring. The white gel so obtained is filled in a stainless steel autoclave and it is capped tightly and put in an oven. The crystallization is carried out at 160° C. for 10 days. Then the autoclave is removed from the oven, the crystallization is terminated by quenching the autoclave with cold water. The autoclave is opened after it is cooled, the contents are filtered, washed thoroughly with deionised water, dried at 120° C. The x-ray diffraction data correspond to those given in Table 1. Calcination of assynthesized crystalline aluminosilicate is done at 450°–550° C. for 16 hours. The chemical composition of the material on anhydrous basis was found to be:0.6 $Na_2O:Al_2O_3:146$ $SiO_2$.

EXAMPLE 2

In this example the detailed method of the preparation of a molecular sieve material with higher amount of aluminum will be described In a typical preparation 2.70 g. $Al(NO_3)_3.9H_2O$ and 5 g. Sulphuric acid were added to 50 g. distilled water to yield solution A. The solution A is mixed to the reaction vessel containing 30 g. TEOS with continuous stirring for half an hour. Then 8.57 g. hexamethylenebis(triethyl ammonium bromide) in 30 g. $H_2O$ was added slowly to aluminosilicate mixture. Finally 1.9 g. NaOH in 20 g. $H_2O$ was added under vigorous stirring. The white gel so obtained is filled in a stainless steel autoclave and it is capped tightly and put in an oven. The crystallization is carried out at 160° C. for 10 days. Then the autoclave is removed from the oven, the crystallization is terminated by quenching the autoclave with cold water. The autoclave is opened after it is cooled, the contents are filtered, washed thoroughly with deionised water, dried at 120° C. The x-ray diffraction data correspond to those given in Table 1. Calcination of assynthesized crystalline aluminosilicate is done at 450°–550° C. for 16 hours. The chemical composition of the material on anhydrous basis was found to be:0.6 $Na_2O:Al_2O_3:36$ $SiO_2$.

EXAMPLE 3

In this example the detailed method of the preparation of the pure silica polymorph of the molecular sieve material will be described. In a typical preparation 8.57 g of hexamethylene bis (triethyl ammonium bromide) and 20 g water were added to the mixture of 30 g. tetraethyl orthosilicate (TEOS) and 1.9 g. NaOH, dissolved in 20 g of water, under vigorous stirring. The white gel so obtained was filled in a stainless steel autoclave and it was capped tightly and put in an oven. The crystallization is carried out at 160° C. for 10 days. Then the autoclave is removed from the oven, the crystallization is terminated by quenching the autoclave with cold water. The autoclave is opened after it is cooled, the contents are filtered, washed thoroughly with deionized water, dried at 120° C. and calcined in air at 550° C. The x-ray diffraction data corresponded to those given in Table 1. The sample was free of Al.

EXAMPLE 4

In this example the detailed method of the preparation of ferrisilicate catalyst composite material will be described. In a typical preparation 0.72 g $Fe(NO_3)_3.9H_2O$ and 5.0 g. sulphuric acid were added to 50 g. distilled water to yield solution A. The solution A is mixed to the reaction vessel containing 30 g. TEOS with continuous stirring for half an hour. Then 8.57 g. hexamethylenebis(triethyl ammonium bromide) in 30 g. $H_2O$ was added slowly to ferrisilicate mixture. Finally 1.9 g. NaOH in 20 g. $H_2O$ was added under vigorous stirring. The white gel so obtained is filled in a stainless steel autoclave and it is capped tightly and put in an oven. The crystallization is carried out at 160° C. for 10 days. Then the autoclave is removed from the oven, the crystallization is terminated by quenching the autoclave with cold water. The autoclave is opened after it is cooled, the contents are filtered, washed thoroughly with deionised water, dried at 120° C. The x-ray diffraction data correspond to those given in Table 1. Calcination of assynthesized crystalline ferrisilicate is done at 480° C. for 16 hours. The chemical composition of the material on anhydrous basis was found to be:

0.7 Na$_2$O:Fe$_2$O$_3$:160 SiO$_2$.

EXAMPLE 5

In this example the detailed method of the preparation of gallosilicate analog of zeolite catalyst composite material will be described. In a typical preparation 0.51 g. Ga$_2$(SO$_4$)$_3$.9H$_2$O in 15 ml alcohol is mixed to the reaction vessel containing 30 g. TEOS with continuous stirring for half an hour. Then 3.3 g. sulphuric acid was added followed by 3.8 g. hexamethylene bis(triethyl ammonium bromide) in 10 g. H$_2$O was added slowly to gallosilicate mixture. Finally 1.9g. NaOH in 18 g. H$_2$O was added under vigorous stirring. The white gel so obtained is filled in a stainless steel autoclave and it is capped tightly and put in an oven. The crystallization is carried out at 160° C. for 10 days. Then the autoclave is removed from the oven, the crystallization is terminated by quenching the autoclave with cold water. The autoclave is opened after it is cooled, the contents are filtered, washed thoroughly with deionised water, dried at 120° C. The x-ray diffraction data correspond to those given in Table 1. Calcination of as-synthesized crystalline gallosilicate is done at 480° C. for 16 hours. The chemical composition of the material was found to be:

0.7 Na$_2$O:Ga$_2$O$_3$:140 SiO$_2$.

EXAMPLE 6

In this example the detailed method of the preparation of borosilicate catalyst composite material will be described. In a typical preparation 0.37 g. H$_3$BO$_3$ and 5 g. Sulphuric acid were added to 30 g. distilled water to yield solution A. The solution A is mixed to the reaction vessel containing 30 g. TEOS with continuous stirring for half an hour. Then 8.77 g. hexamethylene bis (triethyl ammonium bromide) in 30 g. H$_2$O was added slowly to borosilicate mixture. Finally 1.9 g. Na OH in 40 g. H$_2$O was added under vigorous stirring. The white gel so obtained is filled in a stainless steel autoclave and it is capped tightly and put in an oven. The crystallization is carried out at 160° C. for 10 days. Then the autoclave is removed from the oven, the crystallization is terminated by quenching the autoclave with cold water. The autoclave is opened after it is cooled, the contents are filtered, washed thoroughly with deionised water, dried at 120° C. The x-ray diffraction data correspond to those given in Table 1. Calcination of as-synthesized crystalline borosilicate is done at 480° C. for 16 hours. The chemical composition of the material was found to be:

0.6 Na$_2$O:B$_2$O$_3$:150 SiO$_2$.

EXAMPLE 7

This example illustrate the process for replacing the alkali metal ions present in crystalline metallosilicate composite material by ammonium ions. Sample of the product of Example 1-6 are subjected to ammonium exchange. The dry powdered material is refluxed with an aqueous solution of ammonium nitrate at 80°-90° C. for 4 hours. This process was repeated two times. The product so obtained is washed thoroughly with deionised water, dried at 120° C. for 8 hours in an air oven to get ammonium form of the zeolite.

EXAMPLE 8

This example illustrates the process of replacing NH$_4$+ ions present in zeolite composite material by hydrogen ions. The samples of example 4 are calcined at 480° C. for 18 hours in a flow of air to produce catalytically active protonic form of the metallosilicate catalyst composite material. Which may contain H+ or mixture of H+, NH$_4$+ and alkali metal cations.

EXAMPLE 9

In this example, the adsorption properties of the Na form of calcined molecular sieve obtained as the product of example 1 are given. The adsorption measurement were carried out using Cahn balance at 25° C. and at P/$_o$=0.5. The adsorption capacities of the product of example 1 are summarized in Table-2.

TABLE 2

| Sorbate | Adsorption capacities of Na-form of the catalyst composite material. | |
|---|---|---|
| | Uptake (% w/w) | apparent voidage filled (cm$^3$ g$^{-1}$) |
| water | 4.8 | 0.048 |
| n-hexane | 7.0 | 0.1.6 |
| cyclohexane | 6.1 | 0.078 |
| orthoxylene | 7.3 | 0.050 |
| 1,3,5 trimethylbenzene | 4.5 | 0.085 |
| 1,3,5 triisopropylbenzene | 0.0 | 0.000 |

We claim:

1. A process for the preparation of novel crystalline molecular sieves, characterized by an x-ray diffraction pattern as given in Table-1 and a chemical composition in terms of mole ratios of oxides in the anhydrous state by the formula aX$_2$O:bM$_2$O$_3$:cSiO$_2$ where X is a mixture of monovalent cation selected from the group consisting of alkali metal, ammonium and hydrogen, M is selected from Al, B, Fe, Ga, Cr or mixtures thereof and a =0.0 to 1.0, b=0.0 to 1.0 and c=20 or above, said process comprising (i) mixing a source of silicon with (a) a source of alkali metal, (b) an organic compound containing nitrogen selected from the group consisting of hexamethylene bis trialkyl ammonium, salts of hexamethylene bis trialkyl ammonium and mixtures thereof, and (c) optionally, a source of Al, Fe, Ga, Boron or mixtures thereof to form a gel (ii) heating the resultant gel at a temperature in the range of 100°-200° C. under static or rotatic conditions to form a crystalline material (iii) quenching the resultant crystalline material in water, filtering and washing with deionized water thoroughly, (iv) drying at a temperature in the range of 80°-150° C. for a period ranging between 1-16 hours (v) calcining at a temperature in the range of 400°-550° C. for a period of 12-24 hours to obtain a first composite catalyst having predominantly alkali metal as the monovalent cation.

2. A process as claimed in claim 1 further comprising subjecting the first composite catalyst to ion exchange by heating with an aqueous solution containing ammonium ion whereby to produce a second catalyst composite having predominantly ammonium as the monovalent cation.

3. A process as claimed in claim 2 further comprising calcining the second catalyst composite by heating at a temperature in the range of 400°-550° C. for a time period in the range of 8-24 hours to obtain a final catalyst composite having predominantly hydrogen as the monovalent cation.

4. A process as claimed in claim 3 wherein the source of silicon is selected from the group consisting of silicon oxide, silicon chloride and tetra alkyl ortho silicate.

5. A process as claimed in claim 3 wherein the source of Al, Fe, Ga, Cr or B is a salt of Al, Fe, Ga, Cr or B.

6. A process as claimed in claim 3 wherein the aqueous solution containing ammonium ion for the ion-exchange is selected from the group consisting of ammonium chloride, ammonium sulfate, ammonium nitrate, ammonium acetate, and ammonium hydroxide.

7. A process as claimed in claim 3 further comprising mixing the third catalyst composite with a binder.

8. A process as claimed as claim 3 wherein the metal ions in the composite material are in the form of trivalent positive oxidation state and are present in crystalline framework lattice position.

9. A process as claimed in claim 3 wherein the mixing step comprises mixing the source of silicon, the source of alkali metal, and the organic compound containing nitrogen with the source of Al, Fe, Ga, Boron, Cr or mixtures thereof.

10. A process as claimed in claim 3 wherein the mixing step consists of mixing components consisting essentially of the source of silicon, the source of alkali metal, the organic compound containing nitrogen and water such that the process is used for the preparation of a pure silica polymorph.

11. A process as claimed in claim 3 wherein the source of alkali metal is an alkali metal salt.

12. A process as claimed in claim 11 wherein the alkali metal salt is a nitrate, chloride, hydroxide, oxide, or mixtures thereof.

13. A process as claimed in claim 6 wherein the alkyl groups in the organic compound containing nitrogen are selected from the group consisting of ethyl, propyl and mixtures thereof, and the salts of hexamethylene bis trialkyl ammonium are the chloride, bromide, iodide or hydroxide salts, or mixtures thereof.

14. A process as claimed in claim 7 wherein the binder is selected from the group consisting of silica, alumina, bentonite, kaolinite, and mixtures thereof.

15. A molecular sieve prepared by the process of claim 1.

16. A molecular sieve prepared by the process of claim 2.

17. A molecular sieve prepared by the process of claim 3.

18. A molecular sieve prepared by the process of claim 10.

* * * * *